United States Patent [19]

Chan

[11] Patent Number: 5,233,650
[45] Date of Patent: Aug. 3, 1993

[54] TELEPHONE SUPPORT DEVICE

[75] Inventor: Dennis Chan, Hong Kong, Hong Kong

[73] Assignee: Sun Plan Investments Limited, Hong Kong, Hong Kong

[21] Appl. No.: 752,677

[22] PCT Filed: Feb. 28, 1990

[86] PCT No.: PCT/GB90/00309
§ 371 Date: Oct. 14, 1991
§ 102(e) Date: Oct. 14, 1991

[87] PCT Pub. No.: WO90/10348
PCT Pub. Date: Sep. 7, 1990

[30] Foreign Application Priority Data

Mar. 3, 1989 [GB] United Kingdom ............... 8904912

[51] Int. Cl.⁵ ............................................. H04M 1/00
[52] U.S. Cl. .................................. 379/430; 379/446; 379/449
[58] Field of Search ............... 379/430, 446, 449, 455, 379/428; 381/183, 187

[56] References Cited

U.S. PATENT DOCUMENTS

| | | | |
|---|---|---|---|
| 2,020,084 | 11/1935 | Sidders | 379/449 |
| 2,481,387 | 9/1949 | Bonecutter | 379/446 |
| 2,505,210 | 4/1950 | Scher | 379/446 |
| 2,998,497 | 8/1961 | May | 379/469 |
| 4,048,453 | 9/1977 | Seidel | 379/430 |
| 4,121,061 | 10/1978 | Donaldson | 379/430 |
| 5,086,464 | 2/1992 | Groppe | 379/433 |

FOREIGN PATENT DOCUMENTS

| | | | |
|---|---|---|---|
| 479272 | 7/1975 | U.S.S.R. | 379/446 |
| 1413839 | 11/1975 | United Kingdom | 379/449 |

Primary Examiner—James L. Dwyer
Assistant Examiner—Jack Chiang
Attorney, Agent, or Firm—Fredrikson & Byron

[57] ABSTRACT

A telephone handset support device comprising a resilient headband provided with earpads for engaging the ears of the use, and a clip detachably attached to one earpad. The clip detachably connects to the headband and a central opening allows sound from the speaker in the telephone earpiece to pass through the connection to the user's ear. The clip includes a pair of spaced resilient gripping arms which extend generally outwardly away from a base of the clip and towards one another to define a region into which the earpiece of a telephone handset can be placed such that the arms grip around that earpiece. A resiliently mounted lever is urged towards the base and bears on the end of the earpiece so as to press this against the base and together with the gripping arms retains the earpiece in the clip.

14 Claims, 4 Drawing Sheets

TELEPHONE SUPPORT DEVICE

BACKGROUND OF THE INVENTION

This invention relates to a telephone support device and in particular a device which includes a headband which rests over the user's head and which can support an existing telephone handset with the earpiece against the ear so that the user's hands can be left entirely free.

Telephone handset support devices of this general type are known and are to be preferred to trying to balance the handset on the user's shoulder. Examples of known devices are shown in U.S. Pat. Nos. 2,481,387, 4,048,453, 2,020,084 and 4,121,061. The arrangement described in those earlier patents however either requires the telephone handset itself to be specially adapted as in U.S. Pat. No. 4,121,061 or to employ a loop or the like which fits as a strap round the earpiece to hold the handset in place. Such an arrangement may have been satisfactory when virtually all telephones were of the same shape and size so that the strap would fit but, with today's modern telephones, the handsets come in such diverse shapes and sizes that it would not be practical to provide an individual strap for each design of handset.

It is therefore an object of the present invention to provide an arrangement which is capable of supporting more or less any telephone handset irrespective of its shape and size.

According to the invention, the telephone handset support device includes a resilient headband capable of fitting over the user's head and provided with earpads adjacent either end for engaging the ears of the user, and a clip which is detachably attached to one earpad, the clip including a base having connecting means for detachably connecting that base to the headband, the connecting means including a central opening so that sound from the speaker in the telephone earpiece can pass through the connection means and headband to the user's ear, a pair of spaced resilient gripping arms which extend generally outwardly away from the base and towards one another to define a region into which the earpiece of a telephone handset can be placed such that the arms grip around that earpiece, and a resiliently mounted lever urged towards the base and arranged to bear on the end of the earpiece so as to press this against the base and together with the gripping arms retain the earpiece in the holder.

The arrangement of the gripping arms and the resiliently mounted lever is found to provide good connection for all shapes and sizes of earpiece of the telephone handset to the clip.

SUMMARY OF THE INVENTION

It is preferred that the connection means include a bayonet arrangement comprising an opposed pair of lugs on either the clip or the headband which engage in corresponding slots or behind corresponding ledges on the other. Such an arrangement has the advantage that the clip can quickly be attached and detached so that the user can quickly and easily attach the telephone handset to the headband when required, and equally quickly remove it when the telephone is not to be used, the clip remaining attached to the telephone at such times, and the headband remaining on the head of the user.

It is further preferred that the bayonet arrangement be arranged so that the pair of lugs are trapped which ever way the clip is twisted. In this way, the arrangement can accommodate left hand and right hand users without any change in the construction of the item. Thus, if the user wishes to wear the arrangement such that the telephone earpiece is against the left ear, then the clip is connected by twisting in one direction so that the telephone mouthpiece hangs in front of the mouth of the user and, conversely if the user wishes to wear the telephone over the right ear, then the user twists the clip in the opposite direction and wears the headband the other way round.

In order to maintain the telephone handset so that its mouthpiece is near the mouth of the user, stop means are desirably provided which prevent the clip twisting relative the headband further than is necessary to trap the lugs in place.

DESCRIPTION OF THE PREFERRED EMBODIMENT

Figure 1:
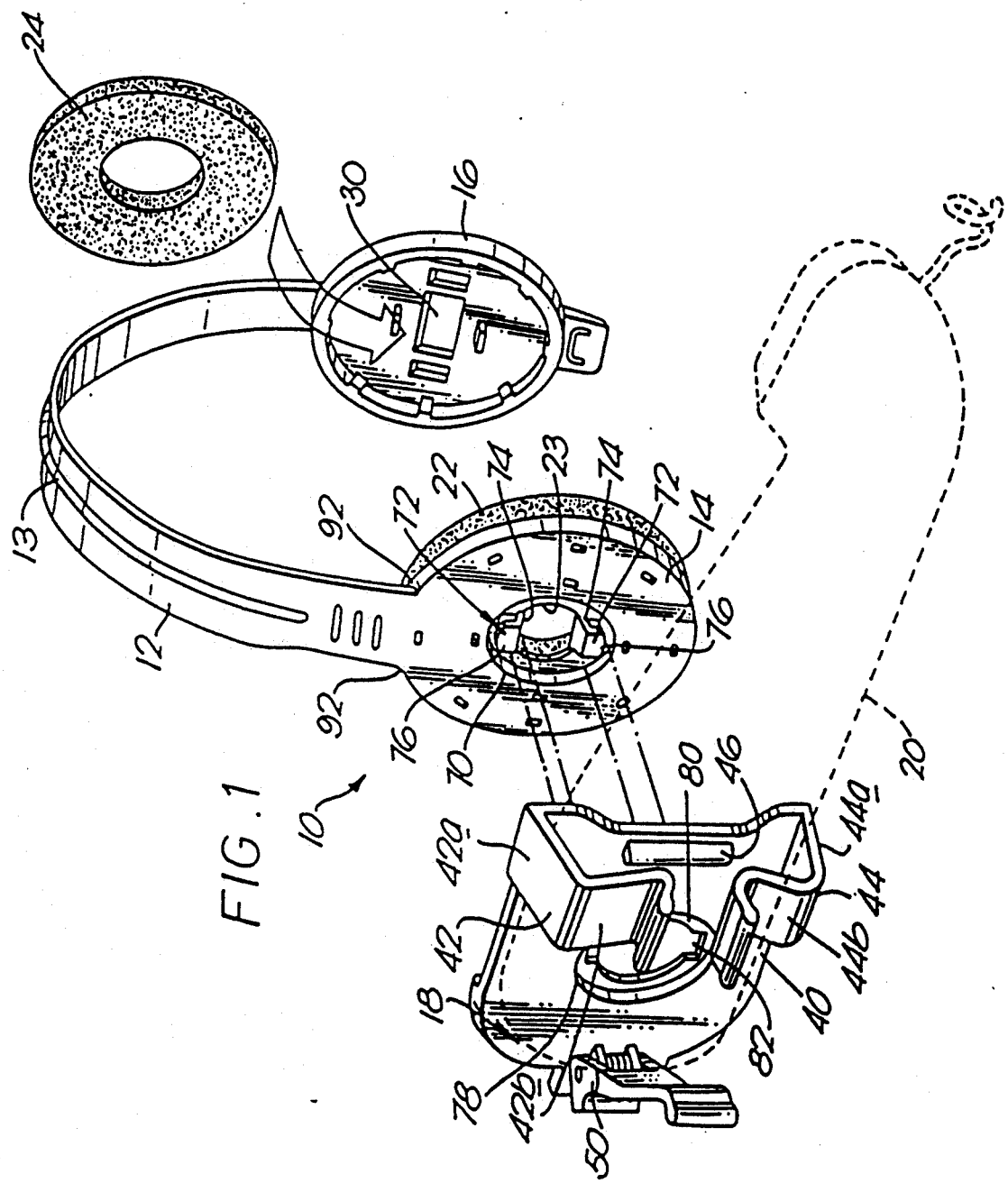
FIG. 1 is a perspective exploded view of the device of the invention showing a telephone handset in broken lines.
Figure 2:
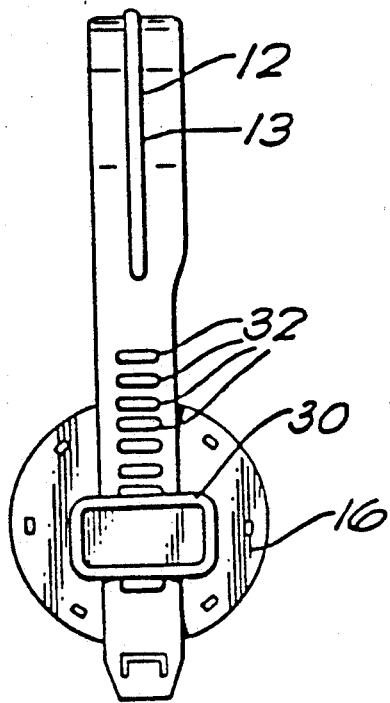
FIG. 2 is a side view from the opposite side of the device shown in FIG. 1.

The telephone handset support device 10 shown in the drawings includes a headband 12 at one end of which is an enlarged earpiece 14. Adjacent the other end is a separate earpiece 16. Detachably attached to the earpiece 14 is a clip 18 which is arranged to support a telephone handset 20 shown diagrammatically in broken lines.

The headband 12 is made of synthetic plastics material and is resilient. It includes an integrally outwardly extending ridge 13 for reinforcement. The headband is designed to grip over the head of a user. To the inwardly directed surface of the earpiece 14 is attached a ring of foam 22 to act as a cushion where the earpiece bears against one of the ears of the user. At the centre of the earpiece 14 is an opening 23 which is aligned with the centre of the ring of foam 22 to allow sound to pass to the ear of the user.

The separate earpad 16 also has a ring of foam 24 on its inwardly directed face to cushion the earpad against the other ear of the user. Also, that earpad 16 has a strap 30 extending outwardly from its outwardly directed face which embraces the end of the headband 12. The end therefore is slidable within that strap to enable the position of the earpad 16 to be adjusted to suit a range of users. To hold the pad in a selected position, the end of the headband 12 has on its outwardly directed surface, a number of integrally formed spaced projections 32 which engage with the edges of the strap to temporarily hold the earpad 16 in a preset position.

Figure 3:
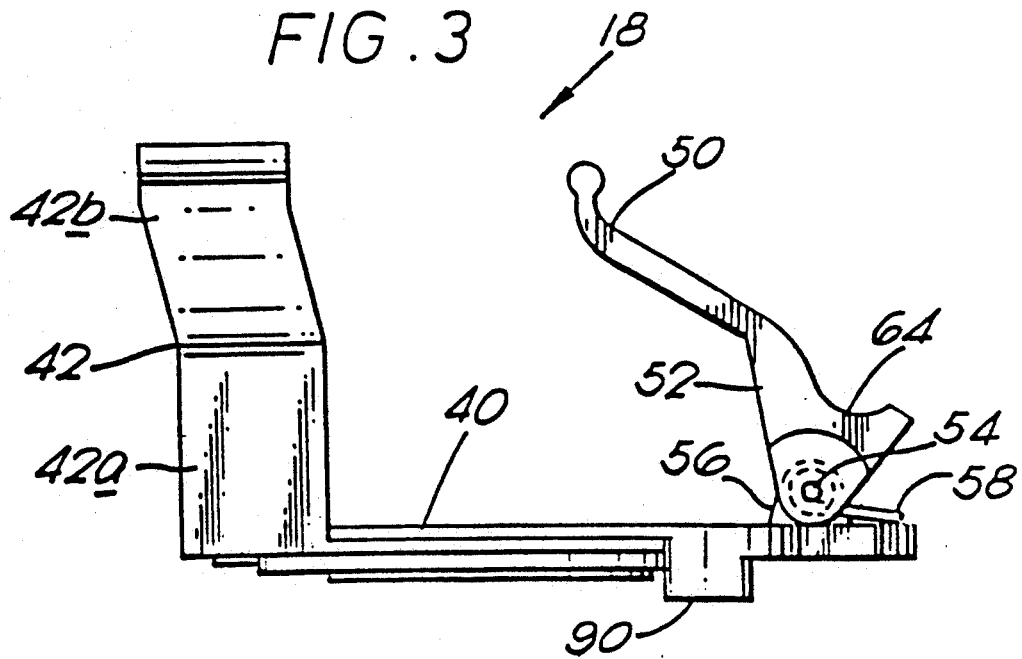
FIG. 3 is an enlarged side view of the clip portion of the device.
Figure 4:
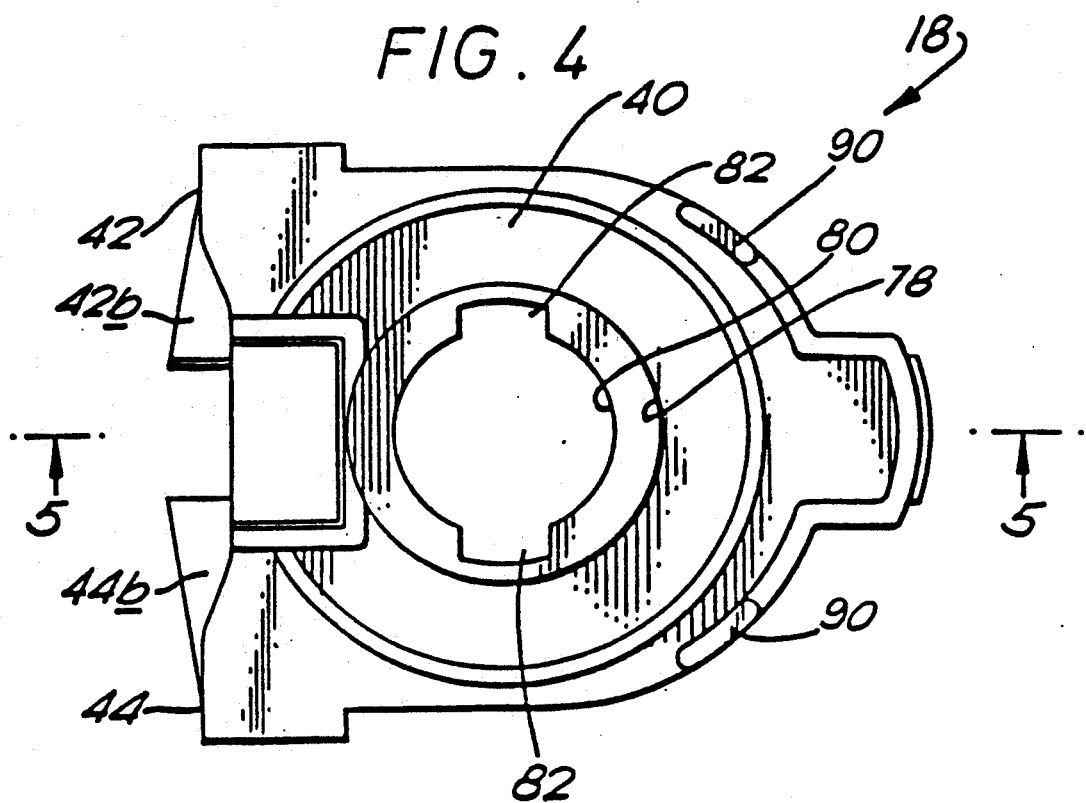
FIG. 4 is an enlarged underneath view of the clip portion.

The clip 18 comprises a substantially flat base 40 having integrally formed with it a pair of upstanding gripping arms 42 and 44. These are formed near to the front end, in the sense viewed in FIG. 1. The clip 18 is made of resilient synthetic plastics material and so the arms 42 and 44 are somewhat resilient and springy. Each arm includes an inner portion 44a and 42a, respectively, integrally formed with the base 40 and extending in a direction such that the arms are bent slightly towards one another, and an outer end portion 42b and 44b, respectively, which are bent over further so as to extend much more towards one another than the portions 42a and 44a. This arrangement allows the arms 42 and 44 to embrace and grip partially around a telephone handset 20. In addition and as best seen in FIG. 3, the portion 42b extend slightly rearwardly as seen in side view as in FIG. 3 whilst the portions 42a are at substantially right angles to the base as seen in side view as in FIG. 3.

Also, integrally formed with the base at the front end of the clip 18, is an integral upstanding lug 46. This will engage the inner end of the earpiece of a telephone and, together with the arms 42 and 44, will prevent that inner end from sliding out of the clip 18.

Figure 5:
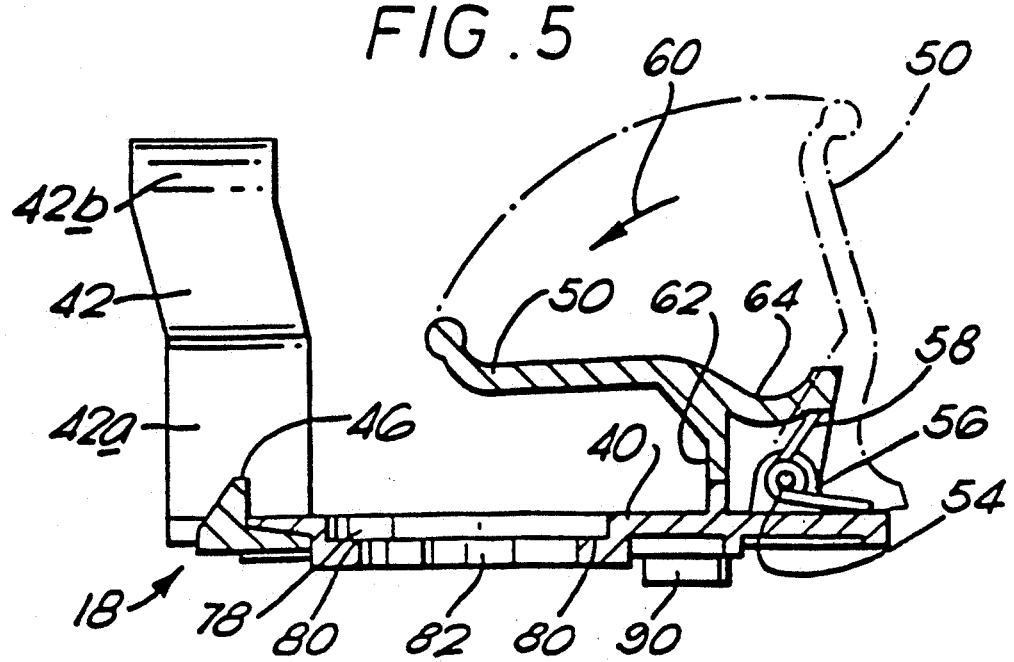
FIG. 5 is a section through the clip shown in FIGS. 3 and 4 taken along the line 5—5 in FIG. 4.

Pivotally mounted on the base 40 is a lever 50. The lever 50 includes side arms 52 through which a pivot pin 54 extends. This pivot pin 54 also extends through a pair of spaced upstanding lugs 56 integrally formed with the base 40 to provide the point about which the lever 50 pivots. Around the pin 54 is a coil spring 58 which bears against the base 40 and lever 50 to urge the lever 50 towards the base in the direction of the arrow 60 shown in FIG. 5. Also as best shown in FIG. 5, the lever has an integrally formed downwardly extending lug 62. This restrains the action of the spring 58 and prevents the lever from moving any further towards the base 40 than the position shown in full lines in FIG. 5 since the lug 62 then bears against the lugs 56 projecting up from the base. The lever can however pivot outwardly to an open position shown in ghost lines in FIG. 5 where the outer end of the arm 50 abuts the base and there is room for a user to insert or remove a telephone handset. In that connection the lever 50 includes an outer finger detent 64 by means of which a user can press on the lever to cause it to move to the open position shown in ghost lines in FIG. 5.

At the centre of the earpiece 14 and coaxial with the opening 23, is a circular recess 70. Projecting into that recess and integrally moulded with the earpiece 14 are a pair of diametrically opposed lugs 72. Each of these includes an outwardly projecting portion 74 substantially paralleled to the axis of the opening 23 and recess 70, and an outer end portion 76 which is directed radially outwardly.

In the base 40 is a circular opening 78. Extending inwardly from the opening is a ledge 80. This extends circumferentially around the opening. Formed in it are a pair of notches 82 which are spaced diametrically apart and are of such a size as to allow the lugs 72 to pass through them.

In order to attach the clip 18 to the headband 12, the clip is pressed against the earpiece 14 with the notches 82 aligned with the lugs 72. They can therefore pass the ledge 80. Then when the clip is twisted relative the headband, the outer end portions 76 of the lugs 72 will engage the ledge and retain the clip in place. To remove the clip, it is simply twisted back to align the lugs 72 and notches 82 and the clip can then be separated from the headband.

Figure 6:
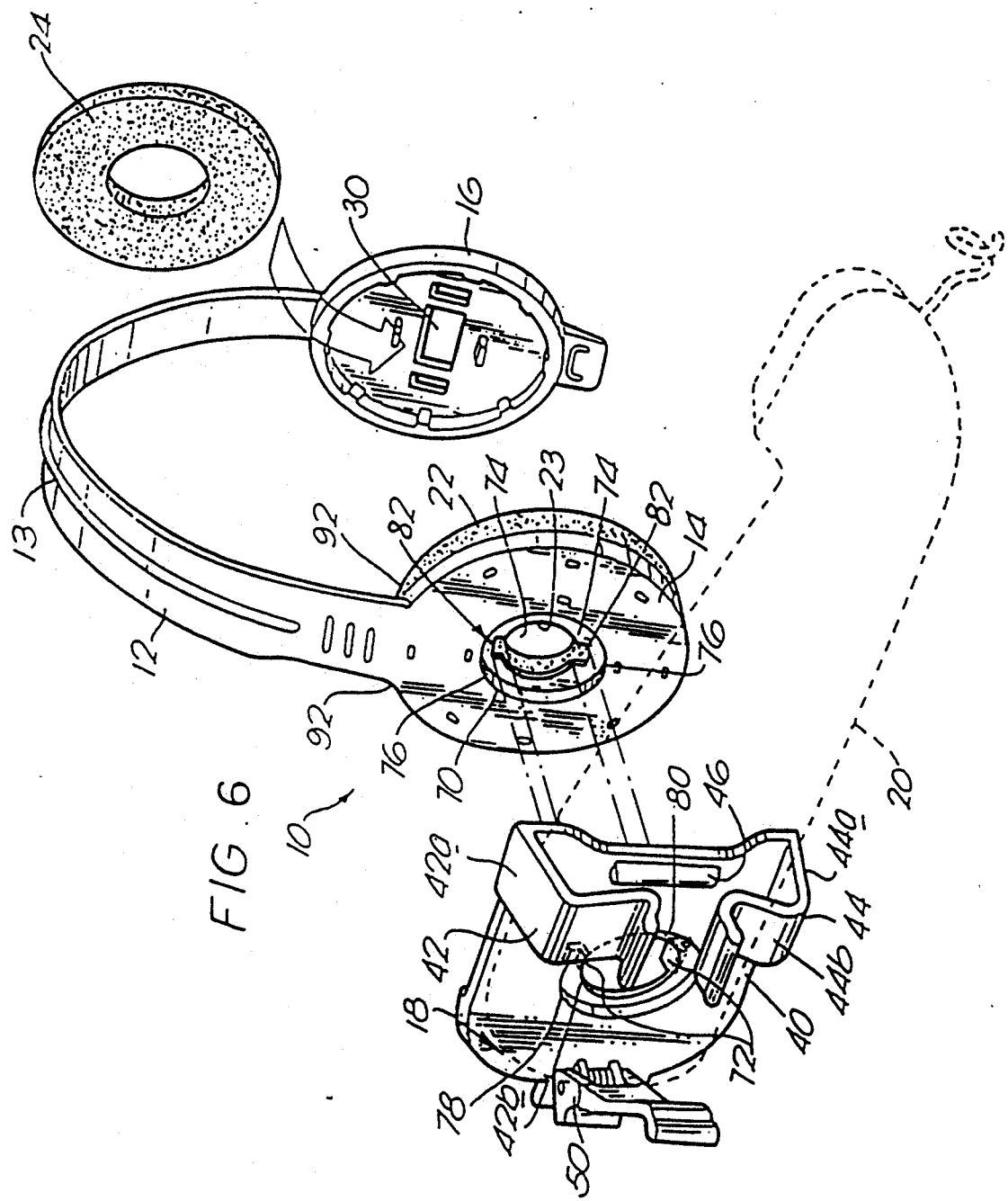
FIG. 6 is a perspective exploded view, similar to FIG. 1, of a modified embodiment of the invention showing a telephone hand set in broken lines.

FIG. 6 shows a modified version of the invention with the lugs 72 being carried on the base 40, and the notches 82 being formed in the ear piece 14, thus reversing the bayonet arrangement shown in FIG. 1.

So as to ensure that the telephone handset does not hang loosely downwardly but is retained with the mouthpiece of the telephone in the front of the user's face near to the mouth, a pair of integrally formed lugs 90 extend downwardly from the base 40. One or other of these, as explained below, will abut the side of the headband in the region 92 (see FIG. 1) and prevent further twisting of the clip relative the headband once the lugs 72 have entered the notches 82 and been trapped by the ledge 80.

The clip can be attached so as to be suitable for a left-handed or right-handed user. In the situation shown in FIG. 1, the telephone is positioned so as to extend forwardly from the right ear of the user. As an alternative, the clip 18 and handset 20 can be rotated through 180° about the axis of the opening 78 and then attached to the earpiece 14. Then the handset will be supported so as to extend forwardly from the left ear of the user.

The arrangement of the lever 50 and arms 42 and 44 enables the clip to be fixed easily to almost any telephone handset. In particular because the lever 50 can be quickly and easily moved to the open position shown in ghost lines in FIG. 5, the earpiece end of the handset can be inserted between the arms 42 and 44 without excessive bending of those arms which might otherwise break them since they need to be sufficiently rigid to support the handset in use.

The sound from the loudspeaker in the handset can reach the user's ears through the aligned openings 78 and 23. However, if desired, an amplifier device can be fitted within the opening 23, such devices being well known and capable of fitment into the earpieces of telephone handsets.

I claim:

1. A telephone handset support device comprising a resilient headband capable of fitting over a user's head and provided with earpads adjacent either end for engaging the ears of the user, and a clip which is detachably attached to one earpad, the clip including a base associated with connecting means for detachably connecting that base to the headband, the connecting means including a central opening so that sound from a speaker in a telephone handset can pass through the connection means and the earpad to the user's ear, a pair of spaced resilient gripping arms and which extend generally outwardly away from the base and towards one another to define a region into which an earpiece of the telephone handset can be placed such that the arms grip around that earpiece, and a resiliently mounted lever urged towards the base and arranged to bear on the end of the earpiece so as to press the earpiece against the base and together with the gripping arms retain the earpiece in the clip.

2. A telephone handset support device as claimed in claim 1 in which the connection means include a bayonet arrangement comprising an opposed pair of lugs on the clip which engage in corresponding slots on the earpad.

3. A telephone handset support device as claimed in claim 2 in which the bayonet arrangement is arranged so that the pair of lugs are trapped in the slots on the earpad which ever way the clip is twisted.

4. A telephone handset support device as claimed in claim 2 or claim 3 in which in order to maintain the telephone handset so that its mouthpiece is near the mouth of the user, stop means are provided on the headband which prevent the clip from twisting relative to the headband further than is necessary to trap the lugs in place.

5. A telephone handset support device as claimed in claim 1 in which each of the resilient gripping arms includes an inner portion and an outer portion, said inner portion being joined to the base and extending in a direction such that these portions of the arms are bent slightly towards one another, and said outer portion bent over further so that the outer portions extend much more towards one another than the inner portions.

6. A telephone handset support device as claimed in claim 1 in which the connection means include a bayonet arrangement comprising an opposed pair of lugs on the earpad which engage in corresponding slots on the clip.

7. A telephone handset support device as claimed in claim 6 in which the bayonet arrangement is arranged so that the pair of lugs are trapped in the slots on the clip which ever way the clip is twisted.

8. A telephone handset support device as claimed in claim 6 or claim 7 in which in order to maintain the telephone handset so that its mouthpiece is near the mouth of the user, stop means are provided on the clip which prevent the clip from twisting relative to the headband further than is necessary to trap the lugs in place.

9. A telephone handset support device as claimed in claim 1 in which the connection means include a bayonet arrangement comprising an opposed pair of lugs on the clip which engage behind corresponding ledges on the earpad.

10. A telephone handset support device as claimed in claim 9 in which the bayonet arrangement is arranged so that the pair of lugs are trapped in the ledges on the earpad which every way the clip is twisted.

11. A telephone handset support device as claimed in claim 9 or claim 10 in which in order to maintain the telephone handset so that its mouthpiece is near the mouth of the user, stop means are provided on the headband which prevent the clip from twisting relative to the headband further than is necessary to trap the lugs in place.

12. A telephone handset support device as claimed in claim 1 in which the connection means include a bayonet arrangement comprising an opposed pair of lugs on the earpad which engage behind corresponding ledges on the clip.

13. A telephone handset support device as claimed in claim 12 in which the bayonet arrangement is arranged so that the pair of lugs are trapped in the ledges on the clip which ever way the clip is twisted.

14. At telephone handset support device as claimed in claim 12 or claim 13 in which in order to maintain the telephone handset so that its mouthpiece is near the mouth of the user, stop means are provided on the clip which prevent the clip from twisting relative to the headband further than is necessary to trap the lugs in place.

* * * * *